United States Patent
Huang

[11] Patent Number: 5,289,957
[45] Date of Patent: Mar. 1, 1994

[54] CONTAINER FIXING SUPPORT

[76] Inventor: Tsu-ping Huang, 4th Floor, 12-1 Alley 15, Lane 214, Chunghsin Road, Sec. 4, Sanchung City, Taipei Hsien, Taiwan

[21] Appl. No.: 854,819

[22] Filed: Mar. 19, 1992

[51] Int. Cl.$^5$ ............................................. B60R 7/02
[52] U.S. Cl. ........................... 224/42.42; 224/275; 224/282; 224/42.45 R; 248/130; 248/133; 248/149; 296/37.8
[58] Field of Search ........ 296/37.1, 37.8, 37.12–37.16; 224/273, 275, 280–282, 42.03 R, 42.03 A, 42.07, 42.08, 42.32–42.36, 42.4, 42.42–42.45 R; 248/130, 132, 133, 136, 139, 143, 149, 151

[56] References Cited

U.S. PATENT DOCUMENTS

| | | | |
|---|---|---|---|
| 2,750,088 | 6/1956 | Agostini et al. | 224/275 |
| 2,957,726 | 10/1960 | Fergason | 248/133 |
| 3,145,007 | 8/1964 | Swinney | 248/149 |
| 3,167,205 | 1/1965 | Smith | 248/133 |
| 3,279,872 | 10/1966 | Howke | 224/275 X |
| 3,727,813 | 4/1973 | Eby | 224/42.42 |
| 3,964,612 | 6/1976 | Skilliter, Jr. et al. | 224/42.42 |
| 4,986,589 | 1/1991 | McNew | 296/37.8 |

Primary Examiner—J. Casimer Jacyna

[57] ABSTRACT

The present invention is related to a container fixing support and particularly to a deliberately designed container fixing support which is specially applied to be quickly and conveniently installed between the two front seats of a car (such as sedan and station wagon) or in a suitable position in the car, essentially comprising two holders, two inner fixing supports, two outer fixing supports, two connecting bases, two fixing plates, a connecting rod and a connecting container; when assembly, the two inner fixing supports are installed at the two ends of connecting rod, and when to install the container together, firstly to dispose the connecting rod between the two fixing supports (plates) on the rear side of the container and then to lock the two inner fixing supports onto the two ends of connecting rod, and then to lock the container in a position nearby the lower side between the two inner fixing supports; secondly to engage the upper and lower ends of each fixing support with a holder and a connecting base respectively, then to lock the two holders in a suitable position on the two inner fixing supports respectively and to lock the two outer fixing supports onto a lower edge of connecting container by means of a long bolt and two nuts; and finally to lock each fixing plate onto each connecting base, then the container fixing support as a whole is well assembled to be installed on the main frame of car between the two front seats in the car (such as sedan and station wagon) or in other suitable position therein through fixing the two fixing plates so that such articles as recording tapes, maps or driving manuals can be container in the container which can be used ar an armrest.

2 Claims, 4 Drawing Sheets

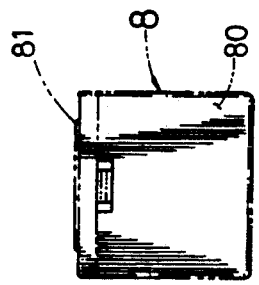
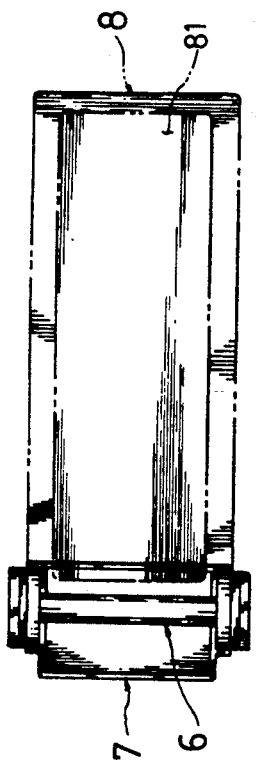
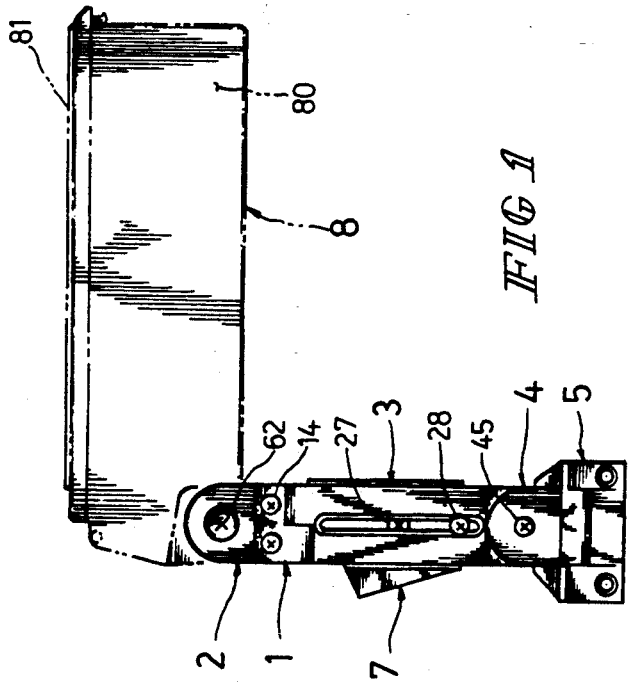
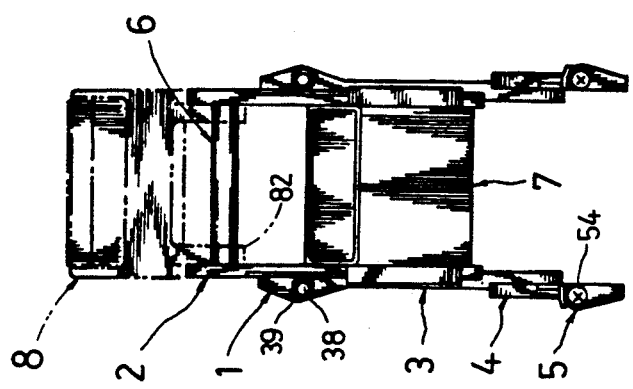

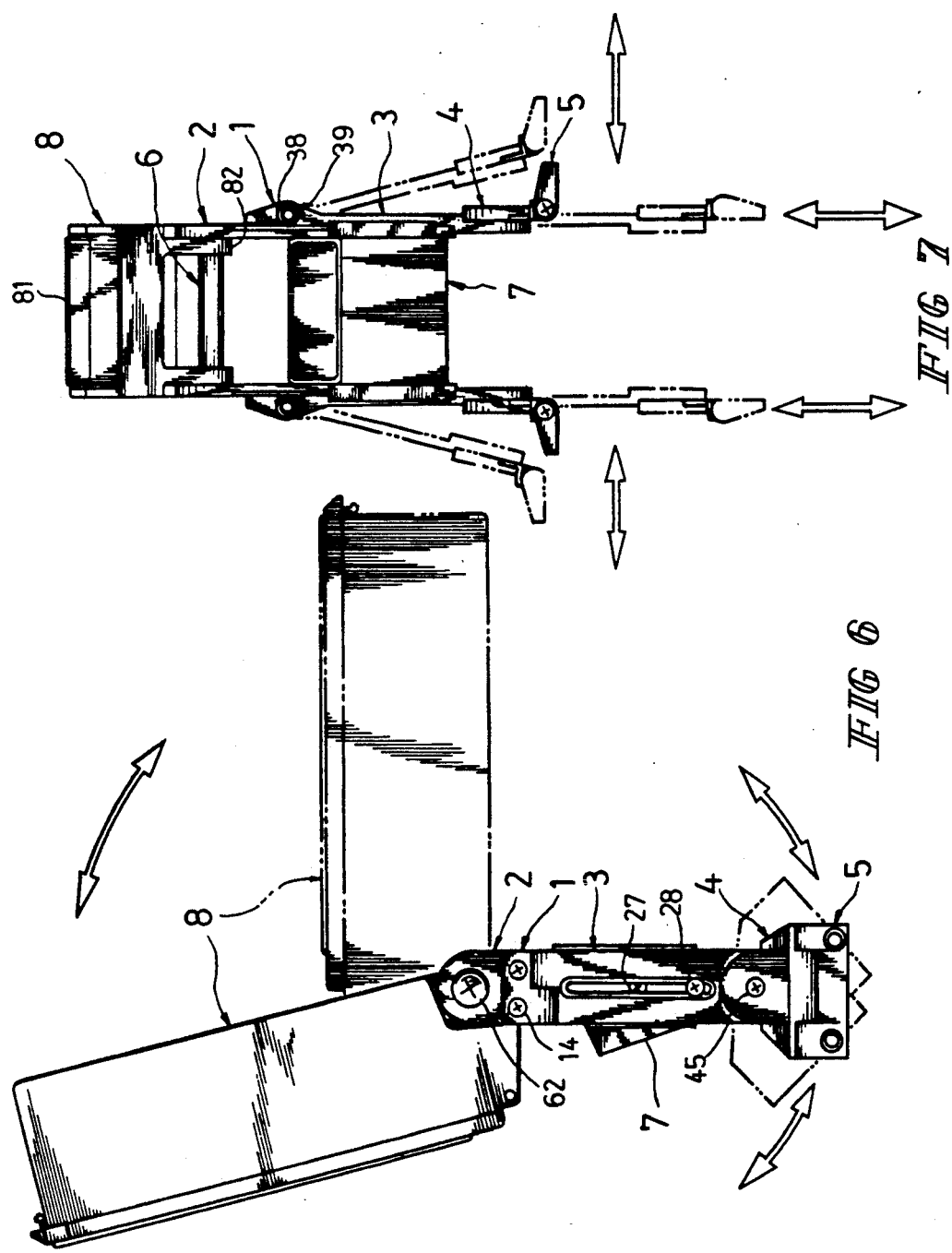

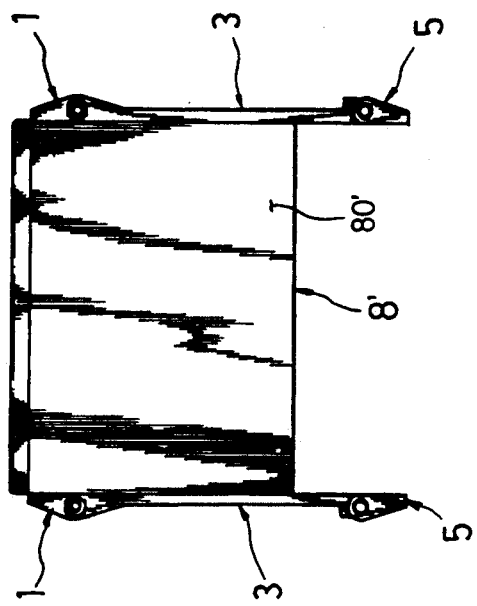
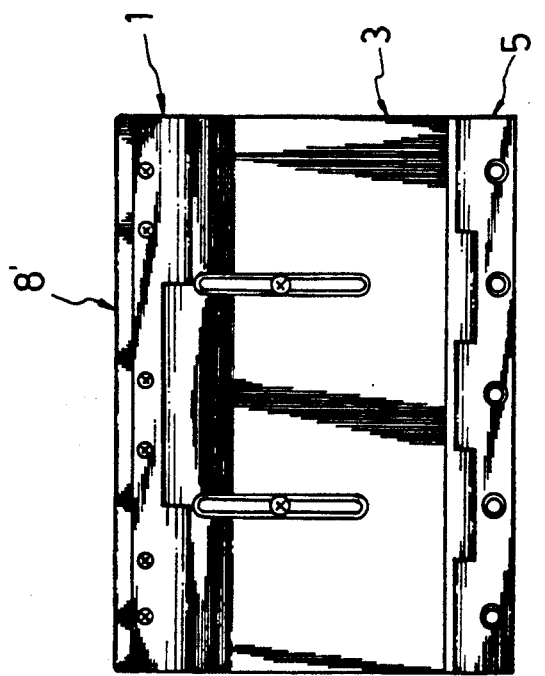

CONTAINER FIXING SUPPORT

BACKGROUND OF THE INVENTION

The present invention is related to a container fixing support and particularly to a deliberately designed container fixing support which is specially applied to be installed between the two front seats of a car (such as a sedan or a station wagon) or in a suitable position in the car.

The conventional container installed in the car is only provided with a hanger or a holder, so it can only be hanged or fixed in a suitable position on the two inner sides or ceiling of the car and looks unpleasant, occupies a large space and will affect the comfort of passengers. Therefore only a few people install and use it.

Recently my wife, Mrs. Huang, invented a container (rack) to be particularly installed between the two front seats of a car (sedan) and filed with the U.S. Patent Office as per the Application Ser. No. 07/782,591. However the fixing support thereof is divided into four pillars which are rather inconvenient for installation, adjustment and use. In view of the above, the present inventor, through his experience in assisting his wife to develop the foregoing container (rack), has invented a container fixing support of which the installation, adjustment and use are quite convenient.

SUMMARY OF THE INVENTION

The object of the present invention is to offer a container fixing support of which the installation is quite quick and convenient regardless of the plane or curved surface of different shapes and dimensions of the main frame between the two front seats of various cars (such as sedan and station wagon); or even in the other suitable positions in the car, so long as there is a small space suitable for fixing the two fixing plates thereof, the said container fixing support can be installed suitably and conveniently.

Another object of the present invention is to offer a container fixing support of which the height and width for installation and use can be suitably and desirably adjusted as the user likes in favor of its installation and use.

BRIEF DESCRIPTION OF THE DRAWINGS

FIG. 1 is a left side view of a container being fixed according to the present invention.

FIG. 2 is a plan of a container being fixed according to the present invention.

FIG. 3 is a rear view of a container being fixed according to the present invention.

FIG. 4 is a front view of the container as shown in FIG. 1, 2 and 3.

FIG. 6 is a schematic left side view of using the container as shown in FIGS. 1, 2 and 3.

FIG. 7 is a schematic rear view of various manners to install the container according to the present invention.

FIG. 9 is a front view of another example of the present invention.

DETAILED DESCRIPTION

Figure 5:
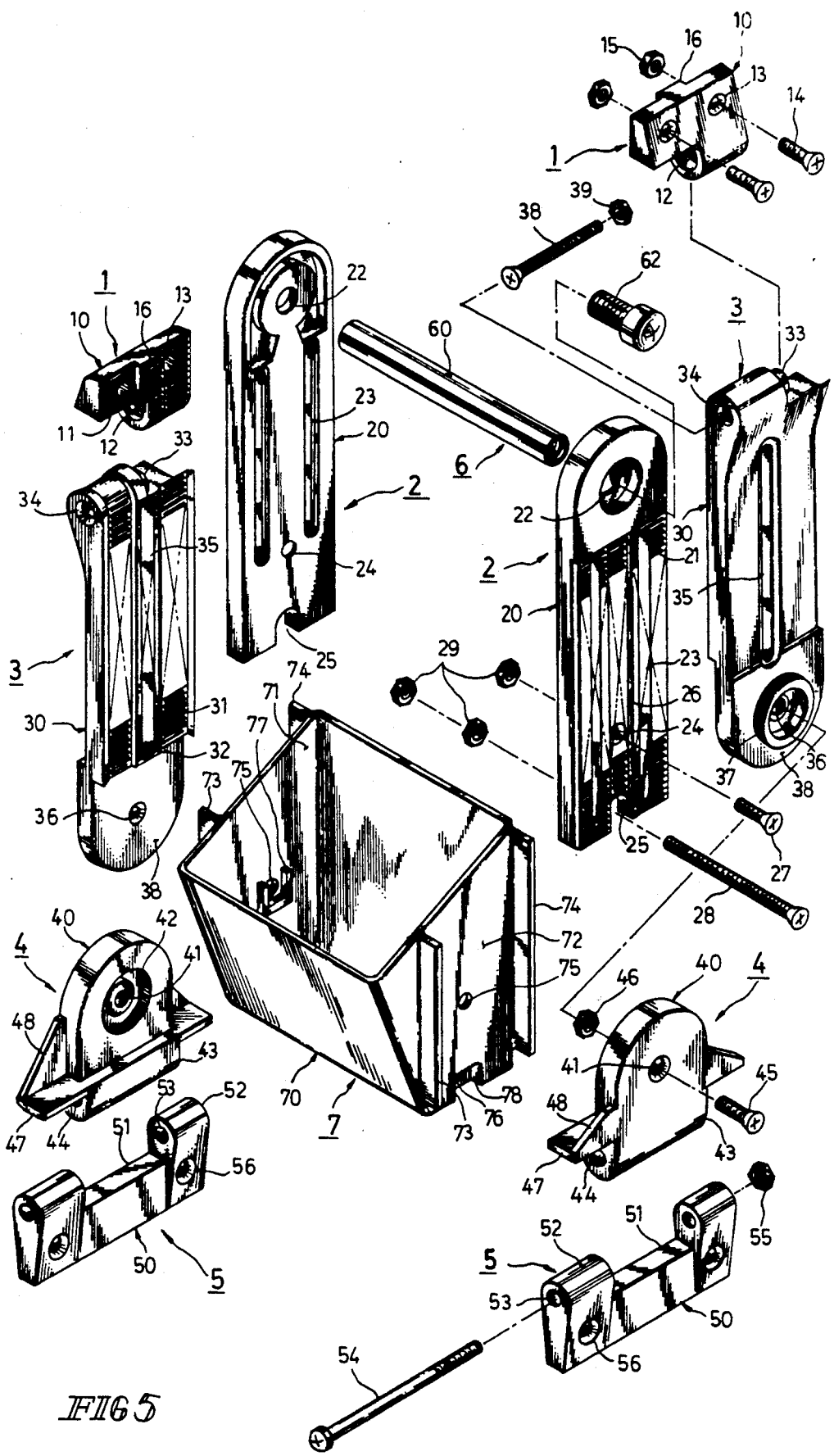
FIG. 5 is an elevational breakdown view of the present invention.

As shown in FIG. 5, a container fixing support according to the present invention is essentially a fixing support for fixing a container, which consists of two holders 1, two inner fixing supports 2, two outer fixing supports 3, two connecting bases 4, two fixing plates 5, a connecting rod 6 and a connecting container 7.

The present invention can be best described in conjunction with FIG. 1 through FIG. 4 as follows:

The holder 1 is a reverse L-shaped holder body 10 of which the inner side is provided with a plurality of evenly-distributed equidistant convex-concave stripes 11; a transverse through hole 12 on the lower side of holder body 10 is designed to engage with the outer fixing support 3; and at least two holes 13 on the holder body 10 are designed to contain two bolts 14 which will engage with nuts 15 so as to fix the holder body 10 onto the inner fixing support 2.

The inner fixing support 2 is a strip support body 20 of which the outer side is provided with a plurality of evenly-distributed equidistant convex-concave stripes 21 corresponding to those convex-concave stripes 11 on the holder 1; a through hole 22 on the upper end of support body 20 is designed to contain a bolt 62 so as to engage with one end of the connecting rod 6; two slots 23 on the support body 20 are designed to contain two bolts 14 so as to fix one holder 1 onto the inner fixing support 2 on the side with the convex-concave stripes 21, and in the scope of said slots 23, the holder 1 can be locked and the holder 1 locking position can be optionally adjusted up and down; a fisheye hole 24 and a reverse U-shaped notch 25 nearby the lower side of said support body 20 and at the lower end thereof respectively are designed to engage with a short bolt 27 and a long bolt 28 to further enage with one or two nuts 29 on the inner and outer sides of two side walls 71 or 72 of the connecting container body 70 or on the inner side of said connecting container 7 so that the two inner fixing supports 2 and the two outer fixing supports 3 can be engaged with the connecting container 7 simultaneously.

The outer fixing support 3 is a strip support body 30 of which the inner side is provided with a plurality of evenly-distributed equidistant convex-concave stripes 31 corresponding to those convex-concave stripes 21; a through hole 34 on one side at the upper end of said fixing support 3 and a protuberance with a short shaft sleeve 33 on another side thereat are designed to engage with a bolt 38 and a nut 39 so as to pivotally engage with one holder 1 and then with one inner fixing support 2 together; a slot 35 in the center of support body 30 is designed to engage with the said long bolt 28 and connecting container 7 and to adjust the width between the two outer fixing support bodies 30; a through hole 36 at the center of a connecting plate 35 at the lower end of said support body 30 and a gear-shaped protuberance 37 on the outer side of the connecting plate 38 are designed to engage with the connecting base 4 through a bolt 45 and a nut 46.

The connecting base 4 is a plate body 40 whereon one side at upper end is provided with a gear-shaped recess 42 corresponding to the gear-shaped protuberance 37 on the connecting plate 35 at the lower end of said outer fixing support body 30, a through hole 41 at the center of said gear-shaped recess 42 to engage with a bolt 45 and a nut 46 and the connecting plate 35 at the lower end of outer fixing support 3, and the locking position of said connecting plate 35 can be optionally adjusted to and fro (but left and right as shown in FIG. 6); a protuberance 43 with a transverse through hole 44 at the lower end of said plate body 40 is designed to pivotally engage with the fixing plate 5.

The fixing plate 5 is a short U-shaped plate body 50 whereon a transverse through hole 53 on a protuberance 52 is provided to each of two sides, the protuberance 43 of connecting base 4 is inserted into a notch 51 at the center on the upper side of plate body 50, the connecting base 4 and the fixing plate 5 are pivotally engaged with each other through a bolt 54 and a nut 55, and then the two fixing plates 5 are fixed onto the main frame between the two front seats of a car (sedan) to support all the members of fixing support according to the present invention and one container 8 pivotally installed thereon.

The connecting rod 6 is a pipe 60 with a suitable length and provided with a screw hole 61 at each of its two ends to be inserted into the rear lower side of a container 8 and engaged with the two inner fixing supports 2 through two bolts 62 so that a container 8 is installed on the fixing support according to the present invention through the two sets of inner and outer fixing supports 2 and 3 (as shown in FIGS. 1 and 3).

The connecting container 7 is a container body 70 with a bottom (or a bottomless frame) and two positioning tracks 73, 74 protruded from the outer side of two side walls 71, 72 to be a connecting frame for locking the two sets of inner and outer fixing supports 2 and 3; therefore, a hole 75 may be provided at the center of the two side walls 71, 72 of container body 70, and a U-shaped flange 77 on the inner wall of said hole 75 is designed to engage with a nut 29 and a short bolt 27 so that the two inner fixing supports 2 are fixed between the two positioning tracks 73, 74 on the said two side walls 71, 72; meantime, a transverse hole 76 may be provided to a position nearby the central lower end (edge) on the two side walls 71, 72 of container body 70, and a reverse U-shaped notch 78 on the outer wall of said hole 76 is designed to engage with a long bolt 28 and two nuts 29 so that the two outer fixing supports 3 are also fixed between the two tracks 73, 74 on the two side walls 71, 72 of container body 70; however, when to turn the two nuts 29 loose, the width of suitably stretching (moving outward) the two outer fixing supports 3 can be desirably adjusted.

As shown in FIGS. 1 through 4, the container 8 according to the present invention is a container body 80 of which the upper side is provided with a cover 81 capable of being opened and closed freely, and such necessities as recording tapes, tissue paper, maps or driving manuals can be contained in the said body 80 of which the rear lower side is provided with a pair of fixing supports (plates) 82 with transverse through hole so as to be fixed onto the connecting rod 6 between the two inner fixing supports 2 of the present invention (as shown in FIG. 3) and to be used as an armrest; and the said fixing supports (plates) 82 can be turned up to be vertical (as shown in FIG. 6) so as to occupy no space when not to use it.

When to assemble, install and use the fixing support of the present invention, as shown in FIG. 1, 2 and 3, firstly to dispose the connecting rod 6 between the two fixing supports (plates) 82 on the rear side of the container 8, then to lock the two inner fixing supports 2 onto the two ends of connecting rod 6 by means of two bolts 62; and to lock the connecting container 7 in a position nearby the lower side between the two inner fixing supports 2 by means of two bolts 27; secondly to engage the upper and lower ends of each outer fixing support 3 with a holder 1 and a connecting base 4 respectively by means of one set each of bolt and nut 38, 39 and 45, 46, then to lock the two holders 1 in a suitable position on the two inner fixing supports 2 respectively by means of two bolts 14 and nuts 15, and to lock the two outer fixing supports 3 onto the lower edge of connecting container 7 by means of a long bolt 28 and two nuts 29; and finally to lock each fixing plate 5 onto each connecting base 5 by means of two sets of bolt and nut 54, 55, then the present invention is well assembled. Then the fixing support of the present invention as a whole together with the container 8 installed on the connecting rod 6 are fixed onto the main frame of car (such as sedan and station wagon) between the two front seat in the car by means of the two fixing plates 5 or other suitable position therein thereby so that such articles as recording tapes, maps and driving manuals can be contained in the container 8 which can be used as an armrest.

As shown in FIG. 7, when to install the present invention on the main frame of car between the two front seats or other suitable position in the car, the width between the two outer fixing supports 3 can be suitably adjusted depending on the different shapes and dimensions of said main frame of various cars (only to turn loose the bolt 28 between the fixing support 3 and the connecting container 7; the two fixing plates 5 can be in a vertical to a horizontal state (as shown in FIGS. 1 and 3 and FIG. 7 respectively) or even in an oblique state depending on the spatial state of main frame of car. Meantime, depending on the different positions to fix the holder 1 onto the inner fixing supports 2, the two outer fixing supports 3 can be suitably pulled down for a change of length so as to change the height of installing the container 8 as required. If the two fixing plates 5 are well installed and then it is found out that the said height is undesirable, the two bolts 14 on the holder 1 and the long bolts 28 between the two outer fixing supports 3 and the connecting container 7 can be turned loose simultaneously, to pull the container 8 together with the two inner fixing supports 2 up and down to a suitable height, and to turn tight the foregoing bolts which have been turned loose, the desirable height of installing the container 8 can be obtained, and even if it is unsatisfactory, it may be repeatedly adjusted to a desirable state in a convenient and quick manner.

Even if the position to be used to install the present invention, such as the said main frame of car, is inclined to and fro in a state of over 45°–90°, the two connecting bases 4 together with the two fixing plates 5 can be adjusted to and fro to a suitable angle and then to install same in line with the imaginary lines as shown in FIG. 6. Then the adjustment thereof to a suitable angle can be easily, quickly and conveniently done through turning loose the two bolts 45.

The container 8 can be turned up to a vertical state (as shown by the solid lines in FIG. 6) when not to use it and turned down to a horizontal state (as shown by the imaginary lines in FIG. 6) when to use it once again. Therefore, some auxiliary structures have to be designed so as to keep the fixing support of the present invention in a stable state when using it or during driving and to prevent it from swinging at the same time. Such auxiliary structures, as shown in FIG. 5, comprises one longitudinal protruded strip 16, 32 each at the center on the inner side of both one holder body 10 and one outer fixing support body 30, and one longitudinal groove 26 at the center of outer side of each inner fixing support body 20 corresponding to the said protruded strip 16, 32 so that when to assemble the holder 1 and outer fixing support 3 with the inner fixing support 2, all these members can be mutually engaged with each other exactly without leading to any loose phenomenon. A protruded positioning piece 47 and a triangular reinforcing plate 48 also may be provided to the two sides of each plate body 40 of the connecting base 4 so that when to lock the connecting base 4, outer fixing support 3 and fixing plate 5 together and to adjust same to and fro as shown by the imaginary lines in FIG. 6, their stability can be further reinforced without leading to any swinging phenomenon.

As shown in FIGS. 8 and 9, if to install a larger container 8' on the present invention, the same structures as those convex-concave stripes 21, two slots 23 and longitudinal groove 26 on the outer side of inner fixing support body 20 may be provided to the two side walls of container body 80' as shown in FIG. 5, then the holder 1, outer fixing support 3 and fixing plate 5 should be widened up to be equal to the length of said larger container 8' for mutal assembly and then directly installed on the two sides of said larger container 8', and finally in line with the foregoing manner, to install it between the two front seats or in other suitable position in the car through the said two fixing plates 5 for use but the larger container 8' cannot be turned up in a vertical state.

I claim:

1. A container fixing support which comprises two holders, two inner fixing supports, two outer fixing supports, two connecting bases, two fixing plates, a connecting rod and a connecting container, wherein:

each of the holders is a reverse L-shaped holder body, of which the inner side is provided with a plurality of evenly-distributed equidistant convex concave stripes, to be fixed onto the outer side of the inner fixing supports, each of the inner fixing supports is a strip support body, of which the outer side is provided with a plurality of evenly-distributed equidistant convex-concave stripes to correspond to those convex-concave stripes on one of the holders, and the lower side of the inner fixing strip support bodies is designed to engage the two inner fixing supports and the two outer fixing supports together with the connecting container;

each of the outer fixing supports is a strip support body, of which the inner side is provided with a plurality of evenly-distributed equidistant convex-concave stripes to correspond to those convex-concave stripes on one of the inner fixing supports, a protuberance on one side of each of the outer fixing strip support bodies and is designed to pivotally engage with a holder which holder then engages an inner fixing support, and the center of the outer fixing strip support body is designed to engage with the connecting container and to adjust the width between the two outer fixing support bodies, and the lower end of the inner fixing strip support body is designed to engage with one of the connecting bases;

each of the connecting bases is a plate body whereon an upper end of one side is provided with a gear-shaped recess to correspond to and engage the gear-shaped protuberance which is provided at the lower end of each of the outer fixing strip support bodies, the locking position of the engaged gear-shaped recesses and protuberances can be optionally adjusted to and fro, and a protuberance at the lower end of the connecting base plate body is designed to pivotally engage with a fixing plate;

each of the fixing plates is a short U-shaped plate body, and the protuberance of the connecting base is inserted in a notch at the center on the fixing plate body for mutual engagement which is capable of swinging left and right;

the connecting rod is a pipe with a suitable length to be inserted in the rear lower side of a container and engaged with the two inner fixing supports so that a container is installed thereon;

the connecting container is a container body with and two positioning tracks protruded from the outer sides of its two side walls to fix each of inner fixing supports between the two positioning tracks, the central lower end on the two outer side walls of the container body are adjustably fixed to the two outer fixing supports; and for assembly, the two inner fixing supports are installed at the two ends of connecting rod, and when to install the container together, firstly to dispose the connecting rod between the two fixing supports and the two fixing plates on the rear side of the container and then to lock the two inner fixing supports onto the two ends of the connecting rod, and then to lock the container in a position adjacent the lower side between the two inner fixing supports; secondly to engage the upper and lower ends of each outer fixing support with a holder and a connecting base respectively, then to lock the two holders in a suitable position on the two inner fixing supports respectively and to lock the two outer fixing supports onto a lower edge of the connecting container; and finally to lock each fixing plate onto each connecting base, then the container fixing support as a whole is well assembled to be installed on the main frame of a car between the two front seats in the car.

2. A container fixing support as claimed in claim 1 wherein a longitudinal protruded strip is provided to the center of each inner side of each one holder body and outer fixing support body, and a longitudinal groove is at the center of outer side of each inner fixing support body to correspond to the protruded strip so that when to assemble the holder and the outer fixing support with the inner fixing support, all these members are exactly engaged with each other without leading to a loose phenomenon, and a protruded positioning piece and a triangular reinforcing plate are provided to the two sides of each plate body of the connecting base so that when to lock the connecting base, the outer fixing support and the fixing plate together to be adjusted left and right, their stability can be further reinforced without leading to any swinging phenomenon.

* * * * *